(12) United States Patent
Takahashi

(10) Patent No.: US 7,606,903 B2
(45) Date of Patent: Oct. 20, 2009

(54) DATA STORAGE DEVICE AND DATA STORAGE METHOD WITH NETWORK ACCESS MANAGEMENT

(75) Inventor: Isao Takahashi, Koshigaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/638,356

(22) Filed: Dec. 14, 2006

(65) Prior Publication Data
US 2007/0143467 A1   Jun. 21, 2007

(30) Foreign Application Priority Data
Dec. 20, 2005   (JP) ............................. 2005-366400

(51) Int. Cl.
*G06F 15/173* (2006.01)
*G06F 15/16* (2006.01)

(52) U.S. Cl. ...................... 709/225; 709/229

(58) Field of Classification Search ......... 709/230–235, 709/225, 229
See application file for complete search history.

(56) References Cited
U.S. PATENT DOCUMENTS 6,791,973 B1* 9/2004 Yahiro ........................ 370/352
7,133,393 B2* 11/2006 Ala-Luukko ................. 370/338
2002/0095359 A1* 7/2002 Mangetsu ..................... 705/30
2004/0054778 A1* 3/2004 Morioka ...................... 709/225
2005/0059416 A1* 3/2005 Ono ............................ 455/457

FOREIGN PATENT DOCUMENTS

| JP | A 2002-123637 | 4/2002 |
| JP | A 2002-209044 | 7/2002 |
| JP | A 2003-108419 | 4/2003 |

* cited by examiner

Primary Examiner—Krisna Lim
(74) Attorney, Agent, or Firm—Oliff & Berridge, PLC

(57) ABSTRACT

A data storage device includes: a reception unit that receives data transmitted from a transmission device via a network; a storage unit that stores the data which has been received and creates registration history data for the stored data; and a charge processing unit that identifies an access point which has been used by the transmission device when accessing the network based upon access history data created by an access management device which monitors access to the network and the registration history data, and performs charge processing for a user of the transmission device according to a result of identification.

14 Claims, 13 Drawing Sheets

FIG. 3

IMAGE MANAGEMENT DB

| IMAGE ID INFORMATION | DATE AND TIME INFORMATION | LOW RESOLUTION DATA STORAGE DESTINATION | LOW RESOLUTION DATA DELETION FLAG | ENCODED DATA STORAGE DESTINATION | ENCODED DATA DELETION FLAG |
|---|---|---|---|---|---|
| 0001 | 2006/1/1 10:00:00 | INTERNAL MEMORY 38 / JJJJJJ | OFF | INTERNAL MEMORY 38 / KKKKKK | OFF |

FIG. 5

ACCESS HISTORY DB

| DATE AND TIME INFORMATION | MEMBERSHIP INFORMATION | IP ADDRESS |
|---|---|---|
| 2006/1/1 10:15:00 | NON-MEMBER | 000.000.001 |

FIG. 7

IMAGE REGISTRATION HISTORY DB

| IMAGE ID INFORMATION | USER NAME INFORMATION | IP ADDRESS |
|---|---|---|
| 0001 | TARO | 000.000.001 |

| USAGE HISTORY INFORMATION | | |
|---|---|---|
| No | PROCESSING INFORMATION | DATE AND TIME INFORMATION |
| ① | STORED | 2006/1/1  10:15:00 |

FIG. 10

IMAGE MANAGEMENT DB

| IMAGE ID INFORMATION | DATE AND TIME INFORMATION | LOW RESOLUTION DATA STORAGE DESTINATION | LOW RESOLUTION DATA DELETION FLAG | ENCODED DATA STORAGE DESTINATION | ENCODED DATA DELETION FLAG |
|---|---|---|---|---|---|
| 0001 | 2006/1/1 10:00:00 | INTERNAL MEMORY 38 / JJJJJJ | OFF | HD65 / MMMMMM | OFF |

FIG. 12

IMAGE REGISTRATION HISTORY DB

| IMAGE ID INFORMATION | USER NAME INFORMATION | IP ADDRESS |
|---|---|---|
| 0001 | TARO | 000.000.001 |

| USAGE HISTORY INFORMATION | | |
|---|---|---|
| No | PROCESSING INFORMATION | DATE AND TIME INFORMATION |
| ① | STORED | 2006/1/1  10:15:00 |
| ② | DL | 2006/1/3  14:30:00 |

DATA STORAGE DEVICE AND DATA STORAGE METHOD WITH NETWORK ACCESS MANAGEMENT

INCORPORATION BY REFERENCE

The disclosure of the following priority application is herein incorporated by reference:

Japanese Patent Application No. 2005-366400 filed Dec. 20, 2005.

BACKGROUND OF THE INVENTION

1. Field of the Invention

The present invention relates to a data storage device and a data storage method, with which data transmitted via a network is received, and this received data is stored.

2. Description of Related Art

In recent years, along with the possibility of exchanging data of high volume at high speed over the internet, the provision of image storage service has become popular, with which image data created by a digital camera is entrusted to a server for storage via the internet.

With this type of image storage service, it is possible to store the image data of an image which has been photographed with a digital camera in some recording region of the server by transmitting that data to the server over the internet. Furthermore, since image data which has been stored can be read out from the server at any time, the user is able freely to transmit image data which has been read out via the internet to an image display device for viewing (for example, refer to Japanese Laid-Open Patent Publication 2002-123637, Japanese Laid-Open Patent Publication 2002-209044, and Japanese Laid-Open Patent Publication 2003-108419).

Since, with such an image storage service, the image data which has been created can be stored even if it is not recorded and stored upon a recording medium such as an internal memory or an externally attached removable memory or the like which is provided to the digital camera, accordingly it becomes possible to photograph images without worrying about the recording capacity of the recording medium, and moreover it is also possible to use the recording region upon the server as a memory for backup over the internet, provided against the possibility of loss of the digital camera or the recording medium.

SUMMARY OF THE INVENTION

Since it is essential to connect the digital camera to the internet using a communication means like a wireless LAN or a cable LAN or the like in order to take advantage of the above described type of image storage service, accordingly, as well as concluding a contract for utilization of the image storage service, the user also needs to conclude an internet contract with an access point service business (hereinafter "access point" will be abbreviated as "AP") which supplies connection services to the internet, and to input the necessary access establishment conditions for connection to the internet to the digital camera.

However, since the input buttons which are provided upon a digital camera are basically not designed with the objective of inputting characters, it is extremely troublesome for the user to input the access establishment conditions by hand operation.

Furthermore, since sometimes the AP service businesses which handle connection services to the internet are different depending upon the area in which the connection service is being utilized, accordingly it is necessary for the user to select an appropriate AP service business which deals with the area in which the communication means to be utilized is installed, and to conclude an internet contract with that business.

Due to this, for example, when an opportunity for photographing an image arises in an area which is managed by an AP service business with which no internet contract has been completed by the user, so that, immediately before taking the photograph, the necessity arises for performing the required tasks in order to set up an internet contract, then a long time period is required for doing the work for setting up this contract and for inputting the settings for this contract into the camera, so that there is a fear that the chance for a photograph will be lost, which is undesirable.

According to the 1st aspect of the present invention, a data storage device comprises: a reception unit that receives data transmitted from a transmission device via a network; a storage unit that stores the data which has been received and creates registration history data for the stored data; and a charge processing unit that identifies an access point which has been used by the transmission device when accessing the network based upon access history data created by an access management device which monitors access to the network and the registration history data, and performs charge processing for a user of the transmission device according to a result of identification.

According to the 2nd aspect of the present invention, in the data storage device according to the 1st aspect, it is preferred that the charge processing unit specifies whether or not the access point that was used by the transmission device when accessing the network is an access point that is managed by an access point service business with which the user has performed registration as a member.

According to the 3rd aspect of the present invention, in the data storage device according to the 2nd aspect, it is preferred that the charge processing unit charges an access point usage fee to the user, when the access point that was used by the transmission device when accessing the network is an access point that is managed by an access point service business with which the user has not performed registration as a member.

According to the 4th aspect of the present invention, in the data storage device according to the 1st aspect, it is preferred that the access point that was used by the transmission device when accessing the network is an access point that was used when the transmission device transmitted data to the storage unit.

According to the 5th aspect of the present invention, in the data storage device according to the 1st aspect, it is preferred that the charge processing unit performs the charge processing when the data stored in the storage unit has been downloaded.

According to the 6th aspect of the present invention, in the data storage device according to the 1st aspect, it is preferred that the data is image data.

According to the 7th aspect of the present invention, in the data storage device according to the 6th aspect, it is preferred that the transmission device is a digital camera.

According to the 8th aspect of the present invention, in the data storage device according to the 7th aspect, it is preferred that, the digital camera creates, based upon the image data that has been created, low resolution data of which a data size is small as compared with the image data, and, after the created image data has been transmitted to the storage unit, deletes the image data that has been transmitted.

According to the 9th aspect of the present invention, in the data storage device according to the 1st aspect, it is preferred that the transmission device creates encoded data based upon the data, and transmits the encoded data to the storage unit.

According to the 10th aspect of the present invention, a data storage method comprises: a first step of receiving data transmitted from a transmission device via a network; a second step of storing the received data; a third step of creating registration history data for the stored data; a fourth step of identifying an access point that has been used by the transmission device when accessing the network, based upon access history data created by an access management device that monitors access to the network and the registration history data; and a fifth step of performing charge processing for a user of the transmission device according to a result of identification.

According to the 11th aspect of the present invention, in the data storage method according to the 10th aspect, it is preferred that in the fourth step, it is specified whether or not the access point that was used by the transmission device when accessing the network is an access point that is managed by an access point service business with which the user has performed registration as a member.

According to the 12th aspect of the present invention, in the data storage method according to the 11th aspect, it is preferred that in the fourth step, an access point usage fee is charged to the user when it has been specified that the access point that was used by the transmission device when accessing the network is an access point that is managed by an access point service business with which the user has not performed registration as a member.

According to the 13th aspect of the present invention, in the data storage method according to the 10th aspect, it is preferred that the access point that was used by the transmission device when accessing the network is an access point that was used when the transmission device transmitted data to the storage unit.

According to the 14th aspect of the present invention, in the data storage method according to the 10th aspect, it is preferred that in the fifth step, the charge processing is performed when the data stored in the second step has been downloaded.

According to the 15th aspect of the present invention, in the data storage method according to the 10th aspect, it is preferred that the data is image data.

According to the 16th aspect of the present invention, in the data storage method according to the 15th aspect, it is preferred that the transmission device is a digital camera.

BRIEF DESCRIPTION OF THE DRAWINGS

FIG. 3 is a schematic figure showing an image management database which is recorded in an image management database recording area;

FIG. 5 is a schematic figure showing an access history database which is recorded in the image management database recording area;

FIG. 7 is a schematic figure showing an image registration history database which is recorded in an image registration history database recording area;

FIG. 10 is a schematic figure showing the image management database which is recorded in an image management database recording area;

FIG. 12 is a schematic figure showing the image registration history database which is recorded in the image registration history database recording area.

DESCRIPTION OF THE PREFERRED EMBODIMENT

In the following, the preferred embodiment of the present invention will be explained in detail with reference to the appended drawings.

Figure 1:
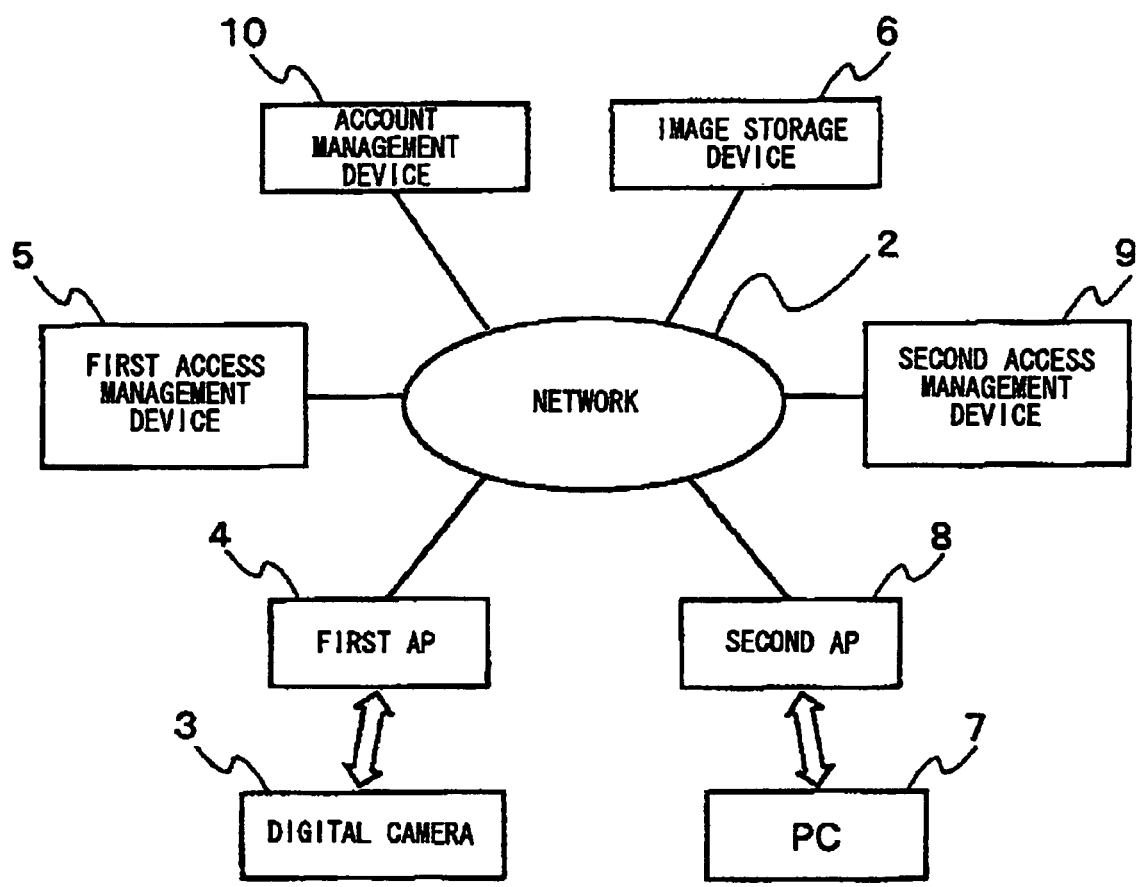
FIG. 1 is a block diagram showing the structure of an image storage system according to the preferred embodiment of the present invention.

FIG. 1 is a block diagram showing the structure of an image storage system according to the preferred embodiment of the present invention.

As shown in FIG. 1, the image storage system 1 according to this preferred embodiment comprises a digital camera 3, a first AP 4 for wireless LAN connection between the digital camera 3 and a network 2, a first access management device 5 for managing access to the network 2 via the first AP 4, an image storage device 6 which stores image data transmitted from the digital camera 3, a personal computer (hereinafter termed a "PC") 7 for viewing images stored in the image storage device 6, a second AP 8 for wireless LAN connection between the PC 7 and the network 2, a second access management device 9 for managing access to the network 2 via the second AP 8, and an account management device 10 which manages inpayments and outpayments to and from accounts.

Although, for convenience, only two APs are shown in FIG. 1, i.e. the first AP 4 and the second AP 8, a plurality of other APs may be connected to the network 2 as well as the first AP 4 and the second AP 8.

In this embodiment, the first AP 4 and the first access management device 5, and the second AP 8 and the second access management device 9, are respectively managed by a first AP service business and a second AP service business. Accordingly, the first AP 4 and the second AP 8 can normally only be utilized by a user who has performed registration as a member with the first AP service business and the second AP service business, respectively.

Furthermore, the image storage device 6 is managed by a storage service business which provides image storage service; and the account management device 10 is managed by one or more banks with which accounts for the user of the digital camera 3 and the PC 7, the first AP service business, the second AP service business, and the storage service business are set up.

In this preferred embodiment, the storage service business makes an agreement with the first AP service business and the second AP service business to the effect that a user who has performed registration as a member with the storage service business is able to utilize the first AP 4 and the second AP 8, even if he has not performed registration as a member with the first AP service business and the second AP service business, instead of paying a usage fee for his use of these APs when he has used the first AP 4 and the second AP 8.

And, in this embodiment, the user of the digital camera 3 has performed member registration with the storage service business, and accordingly he is able to utilize the first AP 4 and the second AP 8, irrespective of whether or not he performs registration as a member with the first AP service business and the second AP service business.

Figure 2:
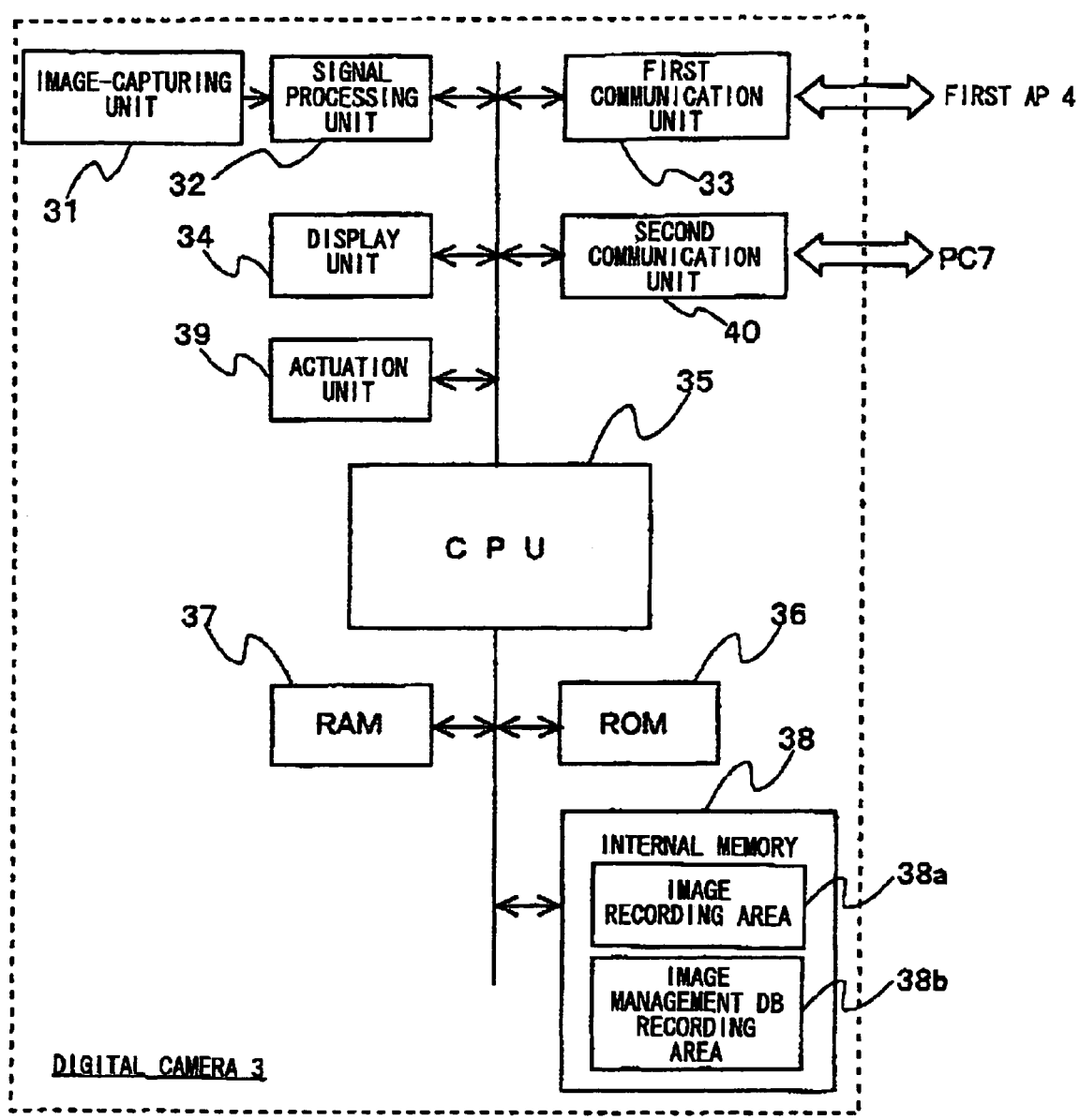
FIG. 2 is a block diagram showing the structure of a digital camera shown in FIG. 1.

FIG. 2 is a block diagram showing the structure of the digital camera 3 shown in FIG. 1.

As shown in FIG. 2, the digital camera 3 comprises a image-capturing unit 31 which captures an image and creates image data, a signal processing unit which performs predetermined signal processing upon this image data, a first communication unit 33 for wireless connection to the first AP 4 via a wireless LAN, a display unit 34 which displays images, a CPU 35 which performs overall control of the camera 3, a ROM 36 in which a control program is stored, a RAM 37 which is used as a recording region during calculation processing, an internal memory 38 which is provided with an image recording area 38a for recording image data and with an image management database recording area 38b for recording an image management database (hereinafter "database" will be abbreviated as "DB"), an actuation unit 39 for actuating the digital camera 3, and a second communication unit 40 for cable connection with a PC 7.

Apart from performing predetermined signal processing such as white balance processing, gamma correction processing and the like upon the image data outputted from the image-capturing unit 31, the signal processing unit 32 also thins down or sub-samples this image data upon which signal processing has been performed, and creates low resolution data in which the number of pixels has been reduced in comparison with the original image data. Moreover, at the same time as creating this low resolution data, the signal processing unit 32 also encodes the image data upon which signal processing has been performed by using a predetermined encoding key, thus creating encoded data. The low resolution data and the encoded data which have been thus created are recorded in the image recording area 38a of the internal memory 38.

The CPU 35 controls the transmission operation during transmission of the image data, and, when image data is being transmitted, along with reading out the encoded data recorded in the image recording area of the internal memory 38 and transmitting it to the image storage device 6, also deletes the encoded data which has been transmitted from the image recording area 38a of the internal memory 38.

Furthermore, when the low resolution data and the encoded data have been created by the signal processing unit 32, the CPU 35 creates image management data which specifies the date and time and the like when the low resolution data and the encoded data were created, and registers this image management data in an image management DB which is recorded in the image management DB recording area 38b of the internal memory 38.

FIG. 3 is a schematic figure showing this image management DB which is recorded in the image management DB recording area 38b. As shown in FIG. 3, the image management data which is registered in this image management DB consists of image ID information, date and time information, information specifying the destination of storage of the low resolution data, low resolution data deletion flags, information specifying the destination of storage of the high resolution data, and high resolution data deletion flags.

The image ID information is an intrinsic identifier which is appended to the image which has been photographed, while the date and time information is data which shows the date and time at which the image data denoted by this image ID information was created.

The information specifying the destination of storage of the low resolution data is data which specifies the location in which the low resolution data is stored, while the information specifying the destination of storage of the encoded data is data which specifies the location in which the encoded data is stored. Since, at the time point that the image is photographed, the low resolution data and the encoded data are both stored in the image recording area 38a of the internal memory 38, accordingly, as shown in FIG. 3, the information specifying the destination of storage of the low resolution data and the information specifying the destination of storage of the encoded data are set to values which indicate locations in the internal memory 38, and moreover are set to values which indicate the addresses within the image recording area 38a in which the low resolution data and the encoded data are recorded.

The deletion flag for low resolution data is a flag which indicates whether or not low resolution data recorded in the internal memory 38 is deleted. This deletion flag for low resolution data is set to "OFF" when an item of low resolution data is not to be deleted, is set to "ON" when an item of low resolution data must be deleted, and is set to "DONE" when it is actually deleted.

The deletion flag for encoded data is a flag which indicates whether or not encoded data recorded in the image storage device 6 is deleted. This deletion flag for encoded data is set to "OFF" when an item of encoded data is not to be deleted, is set to "ON" when an item of encoded data must be deleted, and is set to "DONE" when it is actually deleted. It is arranged that, when the deletion flag for an item of low resolution data has been rewritten, the deletion flag for encoded data is synchronized therewith, and its value is also rewritten: for example, if the value of the deletion flag for an item of low resolution data is rewritten from "OFF" to "ON", then the value of the deletion flag for encoded data is also rewritten from "OFF" to "ON".

At the time point that an image is photographed, both the deletion flag for low resolution data and the deletion flag for encoded data are set to "OFF", as shown in FIG. 3.

When the digital camera 3 accesses the image storage device 6 with the objective of transmitting the encoded data from the digital camera 3 to the image storage device 6, then, during the transmission of the encoded data, the image management data which is created in this manner is also transmitted to the images storage device 6 along with the encoded data. By contrast, when the digital camera 3 accesses the image storage device 6 with the objective of rearranging the stored contents of the internal memory 38 of the digital camera 3 or the stored contents of the image storage device 6, then, during this access, the image management data is transmitted to the image storage device 6 by itself.

Furthermore, in this embodiment, when the digital camera 3 and the PC 7 are connected together by cable via the second communication unit 40, the CPU 35 functions so as to transmit the low resolution data, the encoding key which was used during the encoding processing, and the image management data to the PC 7.

Figure 4:
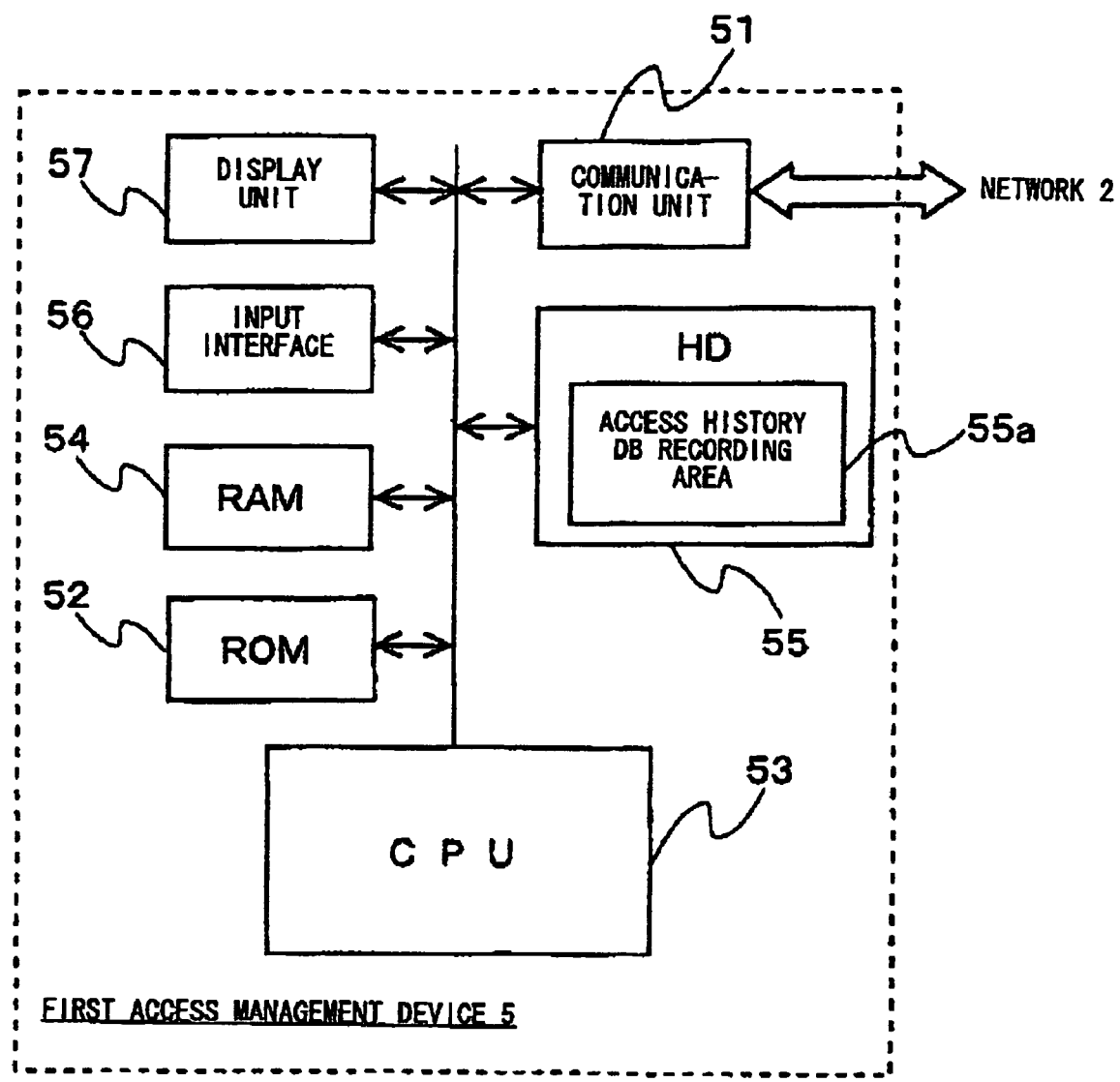
FIG. 4 is a block diagram showing the structure of a first access management device and a second access management device shown in FIG. 1.

FIG. 4 is a block diagram showing the structure of the first access management device 5 and the second access management device 9 shown in FIG. 1.

Since, in this embodiment, the first access management device 5 and the second access management device 9 have the same structure, accordingly, in the following description, only the structure of the first access management device 5 will be explained.

This first access management device 5 is a server device which is connected to the network 2, and it may consist of a general purpose computer which can be connected to the network 2. This first access management device 5, as shown in FIG. 4, comprises a communication unit 51 for connection to the network 2, a ROM 52 which stores an access management program for managing access to the network 2 via the first AP 4, a CPU 53 which performs overall control of the first access management device 5 according to the access management program which is stored in the ROM 52, a RAM 54, a hard disk 55 (hereinafter termed a "HD") upon which is provided an access history DB recording area 55*a* in which an access history DB is recorded, an input interface 56 which includes a keyboard and a pointing device or the like, and a display unit 57.

In this embodiment, when executing the program for access management, the first access management device 5 monitors access to the network 2 via the first AP 4. At this time, if it has been detected that the user has tried to access the network 2 by using a different IP address from the IP address which was assigned to him when registering as a member with the first AP service business, then an IP address is assigned to this user who has thus attempted access.

The first AP service business which manages the first access management device 5 prepares, separately, a plurality of IP addresses for assigning to users who perform registration as members of the first AP service business, and a plurality of IP addresses for assigning to users who do not perform registration as members with the first AP service business. Due to this, when a user attempts to perform access using an IP address which is different from the IP address which was assigned to him when registering as a member, the first access management device 5 selects a single IP address at will from among the plurality of IP addresses which it prepared for assignment to users who have not performed registration as members with the first AP service business, and assigns it to that user.

The IP address which is assigned in this manner is not only transmitted to the digital camera 3 via the first AP 4, but is also transmitted via the network 2 to the image storage device 6. It should be understood that, if access is attempted from a user who has performed registration as a member of the first AP service business, then transmission of this IP address to the digital camera 3 is not performed, but instead, at the same time as permitting access to the network 2, the IP address which was used during access is transmitted to the image storage device 6.

This assignment processing and transmission processing for an IP address is not limited to when access has been attempted for storing encoded data which has been generated by the digital camera 3 in the image storage device 6; it is also executed in the same manner when access is attempted for viewing an image which has been stored in the image storage device 6, or when access is attempted for rearranging images thereupon.

Moreover, in this embodiment, when an access to the network 2 has been performed via the first AP 4, the first access management device 5 creates access management data which indicates the date and time of this access and the like, and registers this data in the access history DB which is recorded in the access history DB recording area 55*a* of the HD 55.

FIG. 5 is a schematic figure showing an access history DB which is recorded in the image management DB recording area 55*a*. As shown in FIG. 5, the access management data which is registered in this access history DB consists of date and time information, membership information, and IP address information.

The date and time information is data which indicates the date and time when access to the network was executed via the first AP 4, while the membership information is data which indicates whether or not registration as a member of the first AP service business is performed or not. When a user who has performed registration as a member with the first AP service business has accessed the network 2, then this membership information is set to a value which indicates "member", while on the other hand, when a user who has not performed registration as a member with the first AP service business has accessed the network 2, then this membership information is set to a value which indicates "non-member".

The IP address information is data which indicates the IP address which was used when accessing the network 2, and, when a user who has performed registration as a member with the first AP service business has accessed the network 2, then the IP address which was assigned when he registered as a member is registered in this field as the IP address information. By contrast, when a user who has not performed registration as a member with the first AP service business has accessed the network 2, then the IP address which was assigned by the first access management device 5 is registered in this IP address information field.

Figure 6:
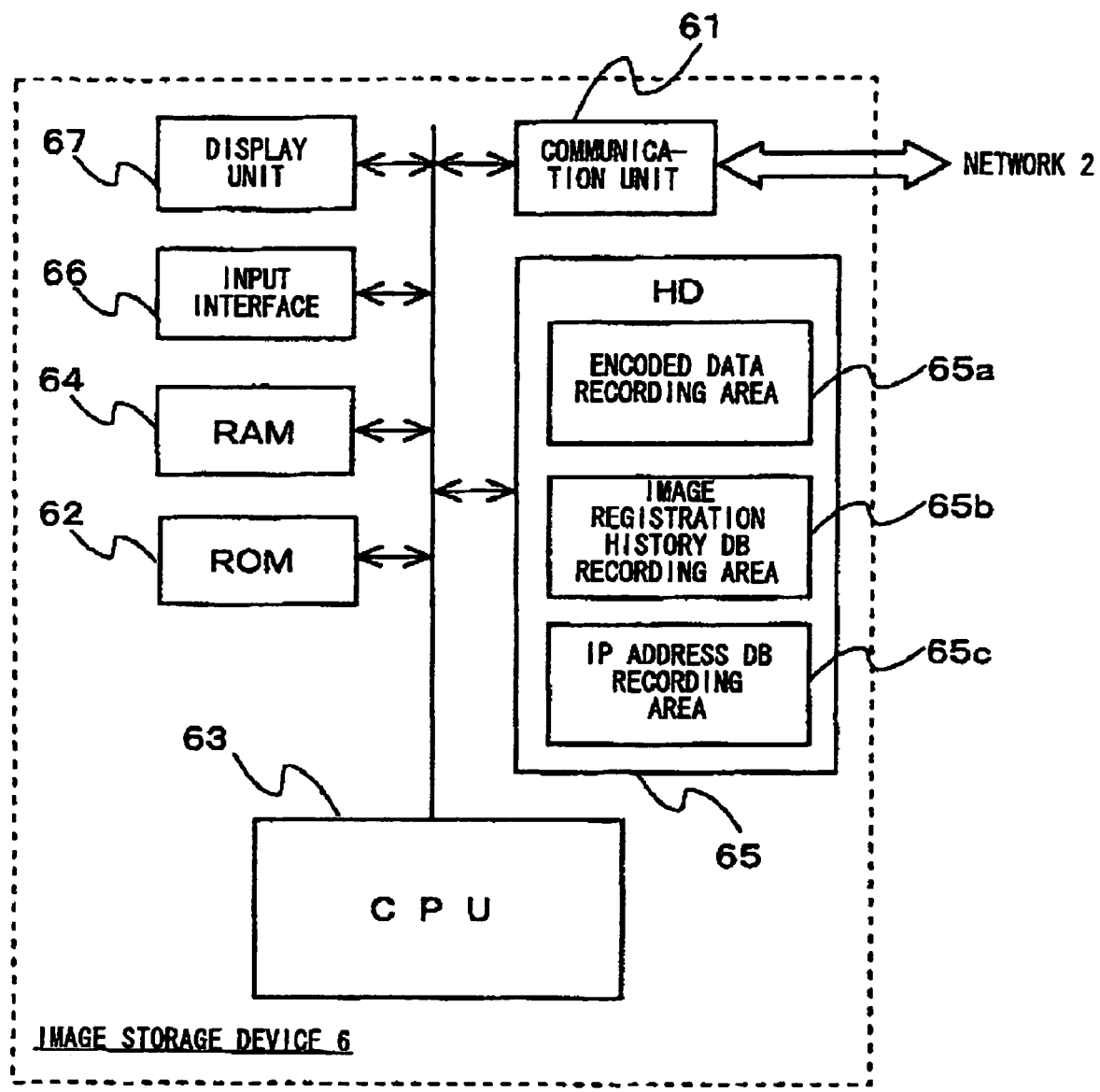
FIG. 6 is a block diagram showing the structure of an image storage device shown in FIG. 1.

FIG. 6 is a block diagram showing the structure of the image storage device 6 shown in FIG. 1.

In this embodiment, just like the first access management device 5 and the second access management device 7, the image storage device 6 is a server device which is connected to the network 2, and it may consist of a general purpose computer which can be connected to the network 2. As shown in FIG. 6, this image storage device 6 comprises a communication unit 61, a ROM 62 which stores a program for image management for managing encoded data which is transmitted from the digital camera 3 and a charging program for charge processing, a CPU 63 which performs overall control of the image storage device 6 according to this program for image management and this charging program which are stored in the ROM 62, a RAM 64, a HD 65, an input interface 66, and a display unit 67. As shown in FIG. 6, an encoded data recording area 65*a* for recording encoded data which is transmitted from the digital camera 3, an image registration history DB recording area 65*b* for recording an image registration history DB, and an IP address DB recording area 65*c* for recording an IP address DB are provided upon the HD 65 of the image storage device 6.

In this embodiment the image storage device 6 is built so as, when image management data is transmitted from the digital camera 3 via the network 2, to create image registration data based upon this image management data which has been transmitted, and so as to register this image registration data in the image registration history DB which is recorded in the image registration history DB recording area 65 of the HD 65.

FIG. 7 is a schematic figure showing an image registration history DB which is recorded in the image registration history DB recording area 65*b*. As shown in FIG. 7, the image registration data which is registered in this image registration history DB consists of image ID information, user name information, IP address information, and usage history information.

The image ID information is data which has been copied from the image ID information in the image management data transmitted from the digital camera 3, while the user name information is data indicating the user name which was set when the user of the digital camera 3 performed registration as a member with the storage service business.

The IP address information is data which indicates the IP address which was transmitted from the first access management device 5 or the second access management device 9 when the user of the digital camera 3 accessed the network 2. In this embodiment, the IP address is not limited to being transmitted when storing the encoded data in the image storage device 6; it is also transmitted from the first access management device 5 or the second access management device 9 when viewing images which are stored in the image storage device 6, or when rearranging those images; but only the IP address which was transmitted when storing the encoded data in the image storage device 6 is registered as IP address information in the image registration history DB.

The usage history information consists of processing information which indicates the processing that was performed when the user accessed the image storage device 6, and date and time information which indicates the date and time at which this processing was performed. This processing information is set to a value which denotes "stored" if the encoded data was stored in the encoded data recording area 65a when the user accessed the image storage device 6, and is set to a value which denotes "downloaded" if the user downloaded encoded data which was recorded in the encoded data recording area 65a. By contrast to the above, when the user has accessed the image storage device 6 with some objective other than storing or downloading encoded data, then the processing information is set to a value which denotes "access".

On the other hand, the IP address DB which is recorded in the IP address DB recording area 65c differs from the image registration history DB, in that it is not created by the image storage device 6, but rather is prepared and is recorded upon the HD 65 by the storage service business.

In order to ensure that the IP addresses which are assigned to users by the first AP service business and the IP addresses which are assigned to users by the second AP service business not to overlap, sets of IP addresses which are mutually different are allocated in advance to each of the first and second AP service businesses as IP addresses which they may use.

The IP address DB which is recorded in the IP address DB recording area 65c is a database which specifies the correspondence relationship between IP addresses and the AP service businesses which may use these IP addresses, and, in this IP address DB, there is registered IP address information consisting of AP service businesses and the IP addresses which these AP service businesses may use, correlated with each other.

Moreover, in this embodiment, when the user downloads encoded data which has been recorded in the encoded data recording area 65a, the image storage device 6 functions so as to perform charge processing in order, along with demanding a downloading fee, also to charge to the user an AP usage fee for the AP service business which manages the AP which the user has utilized.

Figure 8:
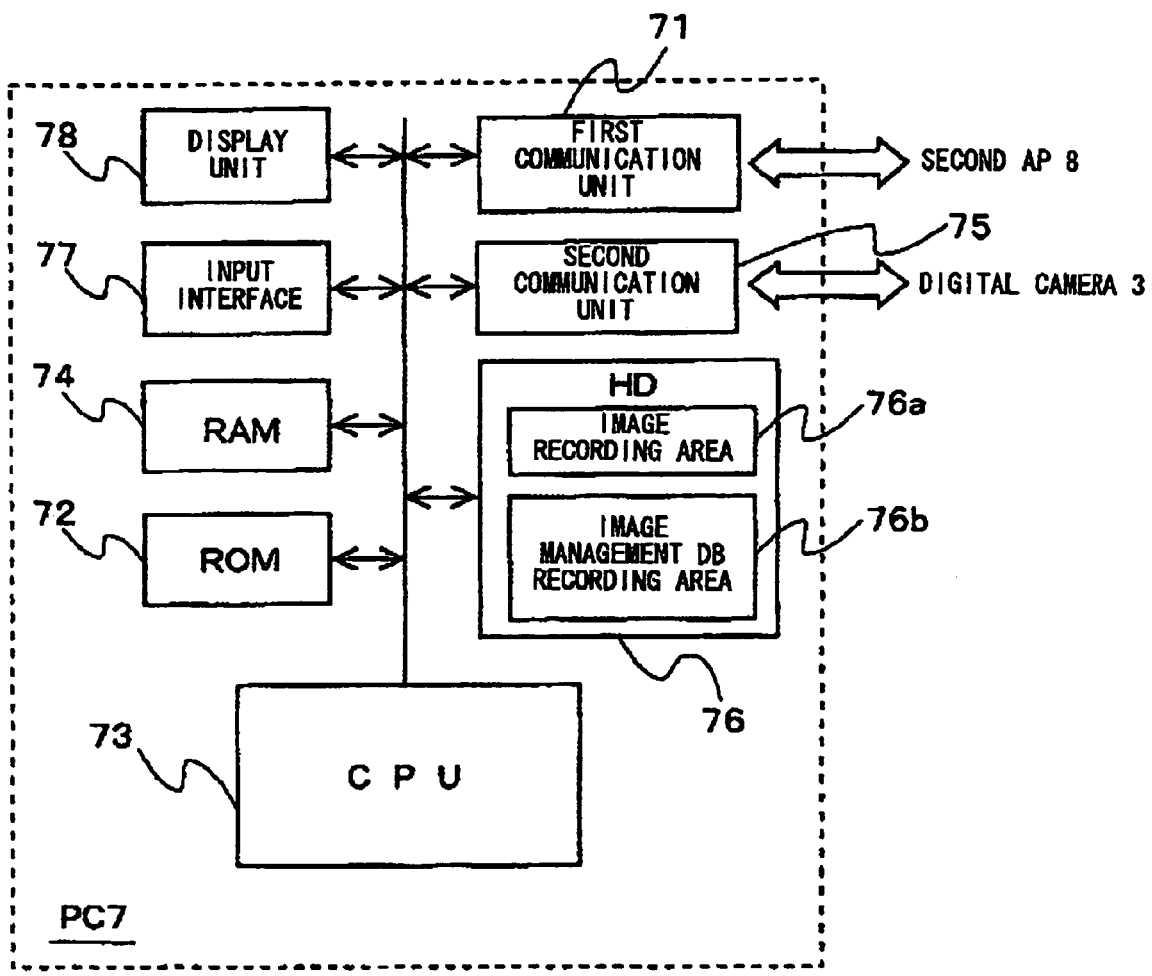
FIG. 8 is a block diagram showing the structure of a PC shown in FIG. 1.

FIG. 8 is a block diagram showing the structure of the PC 7 shown in FIG. 1.

This PC 7 may be structured as a general purpose computer which can be connected to the network 2, just like the image storage device 6 etc., and, as shown in FIG. 8, comprises a first communication unit 71 for wireless connection to the second AP 8 via wireless LAN, a ROM 72 which stores a program for image viewing, a CPU 73 which executes this program for image viewing, a RAM 74, a second communication unit 75 for cable connection to the digital camera 3, an HD 76, an input interface 77, and a display unit 78. As shown in FIG. 8, an image recording area 76a for recording low resolution data and encoding keys, and an image management DB recording area 76b for recording image management data, both transmitted from the digital camera 3, are provided upon the HD 76 of the PC 7.

In this embodiment, when the PC 7 is connected with the digital camera 3 by cable connection via the second communication unit 75, it receives image management data which is transmitted from the digital camera 3, and copies this image management data to the image management DB recording area 76b. Accordingly, in this embodiment, when the digital camera 3 and the PC 7 are connected together, an image management DB is recorded upon the HD 76 of the PC 7, having the same contents as those of the image management DB which is recorded in the internal memory 38 of the digital camera 3.

The account management device 10 consists of a large computer which is installed in a bank or the like, and, based upon commands from the image storage device 6, it performs processing for payment of downloading fees from the account of the user of the digital camera 3 and the PC 7 to the account of the storage service business, and processing for payment of AP usage fees from the account of the storage service business to the account of the first AP service business or to the account of the second AP service business.

By the use of the image storage system 1 having the structure described above, images which have been photographed by the digital camera 3 may be stored in the image storage device 6, and, thereafter, these images which are stored in the image storage device 6 may be downloaded by the PC 7, as will now be described.

Figure 9:
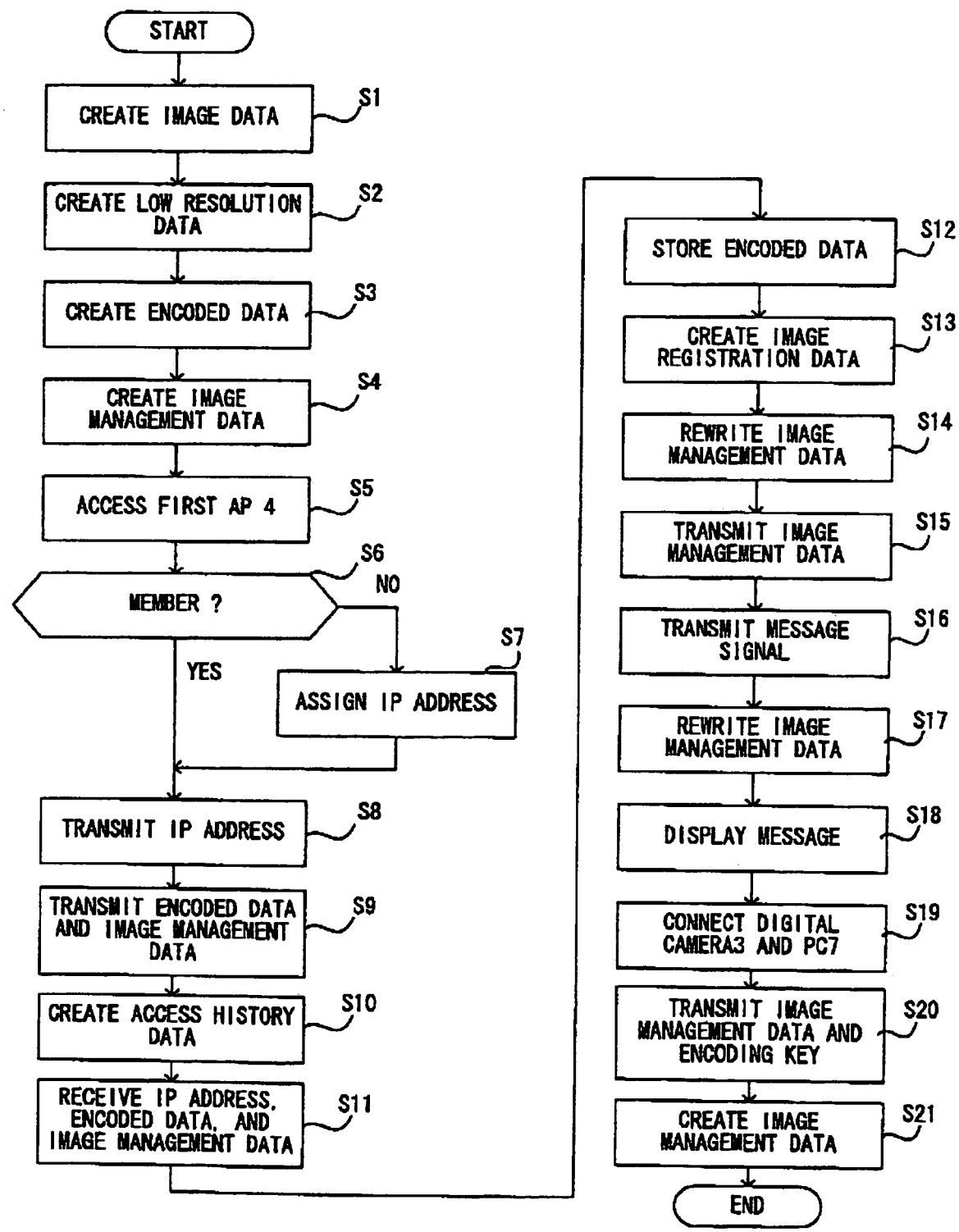
FIG. 9 is a flow chart showing a main routine which stores an image which has been photographed by a digital camera in the image storage device.

FIG. 9 is a flow chart showing a main routine which stores an image which has been photographed by the digital camera 3 in the image storage device 6. Although, for the sake of convenience of explanation, the processes performed by the digital camera 3, the first access management device 5, the image storage device 6, and the PC 7 are all described together in the flow chart of FIG. 9, actually each of the digital camera 3, the first access management device 5, the image storage device 6, and the PC 7 in fact performs its own individual processing steps by executing its own individual program.

When an image is to be stored in the image storage device 6, first, by the digital camera 3, the object to be photographed is photographed, and then image data is created by the image-capturing unit 31 and the signal processing unit 32 (a step S1). Here, this image data which is created due to photography may be either still image data or moving image (video) data.

Next, by the signal processing unit 32, low resolution data and encoded data are created based upon this image data (steps S2 and S3). The low resolution data and the encoded data which are created in this manner are recorded in the internal memory 38 of the digital camera 3.

When the low resolution data and the encoded data are recorded in the internal memory 38 in this manner, by the CPU 35 of the digital camera 3, image management data is created as shown in FIG. 3, and is registered in the image management DB which is recorded in the internal memory 38 (a step S4).

When this image management data is registered in the image management DB, in order to transmit the encoded data from the digital camera 3 to the image storage device 6, the image storage device 6 is designated from the digital camera 3 to the first AP 4 as a destination for access, and an attempt is made to access the network 2 (a step S5).

When this attempt is made to access the network 2, a decision is made (in a step S6) by the first access management device 5 as to whether or not the IP address which was used during access is the same as the IP address which was assigned when registering as a member with the first AP service business.

If the IP address which was used during access is not the same as the IP address which was assigned when registering as a member with the first AP service business, then a single IP address is selected at will by the first access management device 5 from the plurality of IP addresses which have been prepared for assignment to users who are not registered as members with the first AP service business. And thereafter, along with this IP address which has been selected being transmitted to the digital camera 3 and being assigned to the digital camera 3, access to the network 2 is also permitted with this assigned IP address (a step S7).

By contrast, if the IP address which was used during access is the same as the IP address which was assigned when registering as a member with the first AP service business, then selection of an IP address and transmission thereof to the digital camera 3 is not performed, but simply access to the network 2 with the IP address which was used during access is permitted.

It should be understood that, if an attempt is made to access the network 2 using an IP address which is different from the IP address which was assigned when registering as a member with the first AP service business, and when any device on the network 2 other than the image storage device 6 is designated as a destination for access, then not only are selection of the IP address and transmission processing to the digital camera 3 not performed, but also access to the network 2 is refused.

Next, by the first access management device 5, the IP address is transmitted to the image storage device 6 (a step S8). During this transmission of the IP address to the image storage device 6, if the IP address which was used during access is not the same as the IP address which was assigned when registering as a member with the first AP service business, then the IP address which was assigned by the first access management device 5 is transmitted. By contrast, if the IP address which was used during access is the same as the IP address which was assigned when registering as a member with the first AP service business, then the IP address which was used during access is transmitted just as it is to the image storage device 6.

When access to the network 2 is permitted in this manner, by the CPU 35 of the digital camera 3, the image management data which is registered in the image management DB is read out, and is transmitted to the image storage device 6 (a step S9). Since, in this embodiment, only the single data item shown in FIG. 3 as the image ID information "xxxxx" is created as the image management data, accordingly the image management data shown as the image ID information "xxxxx" is transmitted to the image storage device 6 as the image management data which has been newly created.

Furthermore, when access to the network 2 has been permitted, the encoded data which is to be stored in the image storage device 6 is read out from the internal memory 38, and is transmitted to the image storage device along with a storage command signal to the effect that this encoded data is to be stored (the step S9).

Next, as shown in FIG. 5, by the first access management device 5, access history data is created, and this access history data which has thus been created is registered in the access history DB which is recorded upon the HD 55 of the first access management device 5 (a step S10).

When the IP address is transmitted from the first access management device 5 to the image storage device 6 in this manner, and the encoded data and the image management data are also transmitted from the digital camera 3 to the image storage device 6, these data items are received by the image storage device 6 (a step S11).

Next, by the image storage device 6, along with the encoded data being recorded upon the HD 65 of the image storage device 6, also image registration data is created as shown in FIG. 7, and is registered in the image registration history DB which is recorded upon the HD 65 (steps S12 and S13).

Here, since both the low resolution data deletion flag and the encoded data deletion flag for the image management data which has thus been created by the digital camera 3 are set to values which denote "OFF", the image storage device 6 does not delete any encoded data which is recorded upon its HD 65 when the image management data which has been transmitted from the digital camera 3 has been received. However, if for example, on the side of the digital camera 3, actuation has been performed to delete the low resolution data, and the value of the deletion flag for the encoded data has been rewritten to "ON", then the encoded data for the image which is designated by the image ID information is deleted from the HD 65.

When the image registration data which has been created is registered in the image registration DB, then, as shown in FIG. 10, by the image storage device 6, the value of the encoded data storage destination information in the image management data which has been transmitted from the digital camera 3 is rewritten to a value which designates the HD 65 of the image storage device 6, and to a value which designates the address within the encoded data recording area 65a where the encoded data is recorded (a step S14).

Next, along with the image management data in which the value of the encoded data storage destination information has been rewritten being transmitted to the digital camera 3, a message signal is also transmitted to the effect that the encoded data has been stored (steps S15 and S16).

And next, by the digital camera 3, along with the contents of the image management DB recorded in the internal memory 38 being rewritten to the same contents as those of the image management DB shown in FIG. 10 based upon the image management data which has been transmitted from the image storage device 6, also a message is displayed upon the display unit 34 of the digital camera 3 to the effect that the storage of the encoded data has been completed (steps S17 and S18).

Thus, in this manner, the image (the encoded data) which has been created by the digital camera 3 is stored in the image storage device 6.

When the encoded data which has been created by the digital camera 3 is recorded in the image storage device 6, the digital camera 3 and the PC 7 are cable connected together via the second communication unit 40 of the digital camera 3 and the second communication unit 75 of the PC 7 (a step S19).

Next, the low resolution data which has been recorded in the internal memory 38 of the digital camera 3, the encoding key which was used during the encoding processing, and the image management data are transmitted from the digital camera 3 to the PC 7 (a step S20).

And next, by the PC 7, along with the low resolution data and the encoding key which have thus been transmitted from the digital camera 3 being recorded in the image recording area 76a of the HD 76 of the PC 7, also the contents of the image management DB which is recorded in the image management DB recording area 76b of the HD 76 are rewritten, based upon the image management data transmitted from the digital camera 3, to the same contents as the image management DB shown in FIG. 10 (a step S21).

It should be understood that the connection processing between the digital camera 3 and the PC 7 need not necessarily be performed directly after the storage processing of the encoded data in the image storage device 6 has been completed; it would also be acceptable to perform this task at any time point before the encoded data which has been recorded in the image storage device 6 is downloaded.

The encoded data which has been stored in the image storage device 6 by the above procedure is downloaded into the PC 7 as will now be described.

Figure 11:
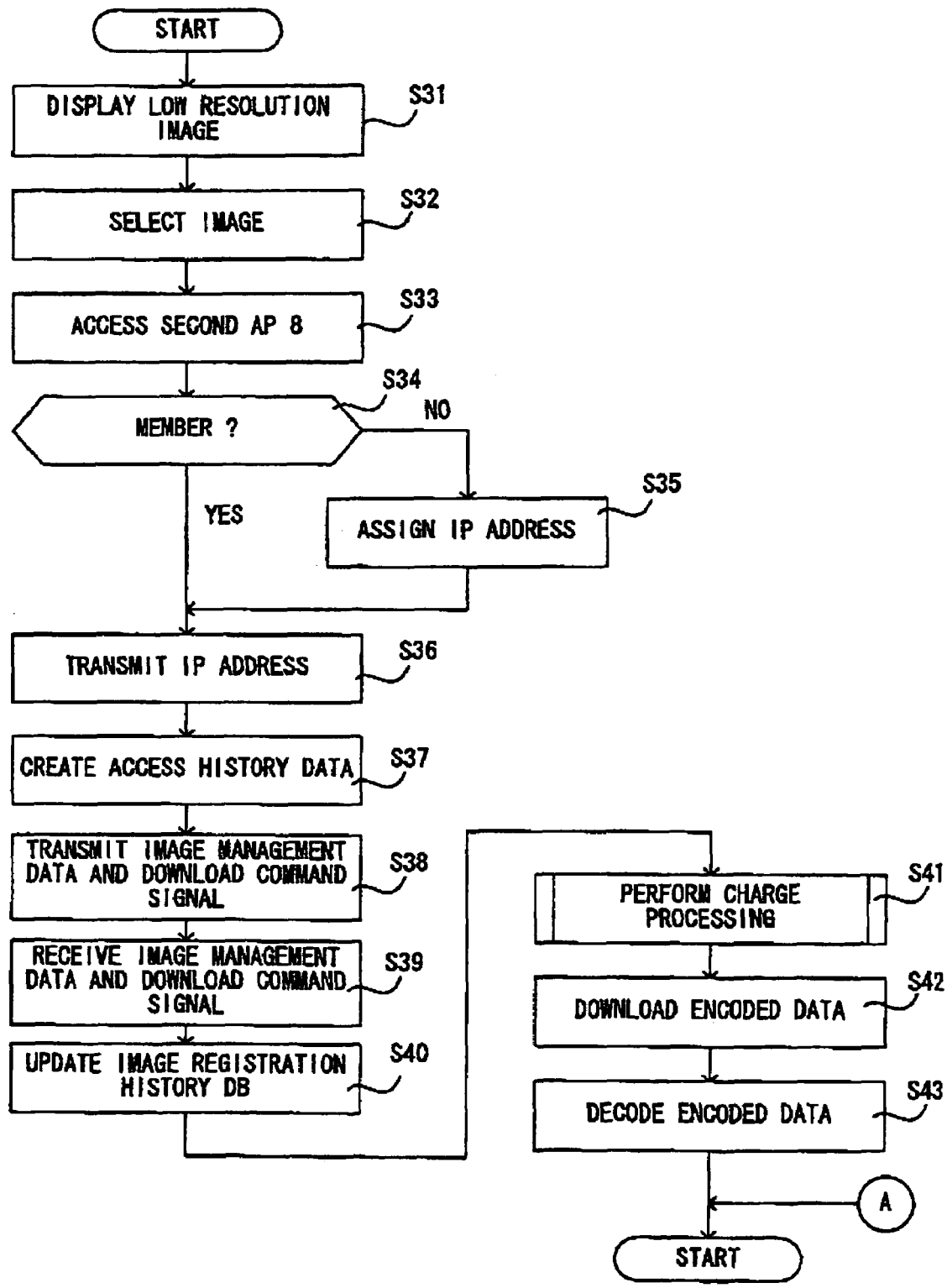
FIG. 11 is a flow chart showing a main routine which downloads encoded data stored in the image storage device to a PC.

FIG. 11 is a flow chart showing a main routine which downloads encoded data stored in the image storage device 6 to the PC 7. Although, for the sake of convenience of explanation, the processes performed by the image storage device 6, the PC 7, and the second access management device 9 are all described together in the flow chart of FIG. 11, actually each of the image storage device 6, the PC 7, and the second access management device 9 in fact performs its own individual processing steps by executing its own individual program.

During this downloading of the encoded data which has been stored in the image storage device 6, first, the low resolution data which has been recorded upon the HD 76 of the PC 7 is read out, and a low resolution image based thereupon is displayed upon the display unit 78 of the PC 7 (a step S31).

Next, this low resolution image displayed upon the display unit 78 of the PC 7 is referred to by the user, and he selects the image which he wishes to download from the image storage device 6 (a step S32).

When the desired image for download has been selected by the user, he issues a command using the input interface of the PC 7 to the effect that this image is to be downloaded, and access is attempted by the PC 7 via the second AP 8 to the network 2 (a step S33).

Next, by the second access management device 9, in the same manner as shown in the steps S6 and S8 shown in the FIG. 9 flow chart, decision processing is performed for deciding whether or not this user has performed registration as a member with the second AP service business, and processing for assignment of an IP address and transmission processing of this IP address to the image storage device 6 are sequentially performed (in steps S34 through S36).

Next, by the second access management device 9, in the same manner as shown in the step S10 shown in the FIG. 9 flow chart, access history data is created and is registered in the access history DB which is recorded upon the HD of the second access management device 9 (a step S37).

Next, by the CPU 73 of the PC 7, the image management data for the image which is desired to download is read out from the image management DB which is recorded upon the HD 76 of the PC 7, and this image management data which has been read out, along with a download command signal to the effect that this image is to be downloaded, is transmitted via the network 2 to the image storage device 6 (a step S38).

Next, by the image storage device 6, along with the image management data and the download command signal which have been transmitted from the PC 7 being received, also the contents of the image registration history DB recorded upon the HD 65 of the image storage device is updated based upon this image management data and download command signal (in steps S39 and S40).

In this updating of the contents of the image registration history DB, as shown in FIG. 12, in the second record of the usage history information, the value of the processing information is set to a value which denotes "download", and data which is set to a value which indicates the download date and time is appended to the value of the date and time information.

When in this manner the update processing for the image registration history DB has been completed, next, charge processing is executed by the image storage device 6 (a step S41).

Figure 13:
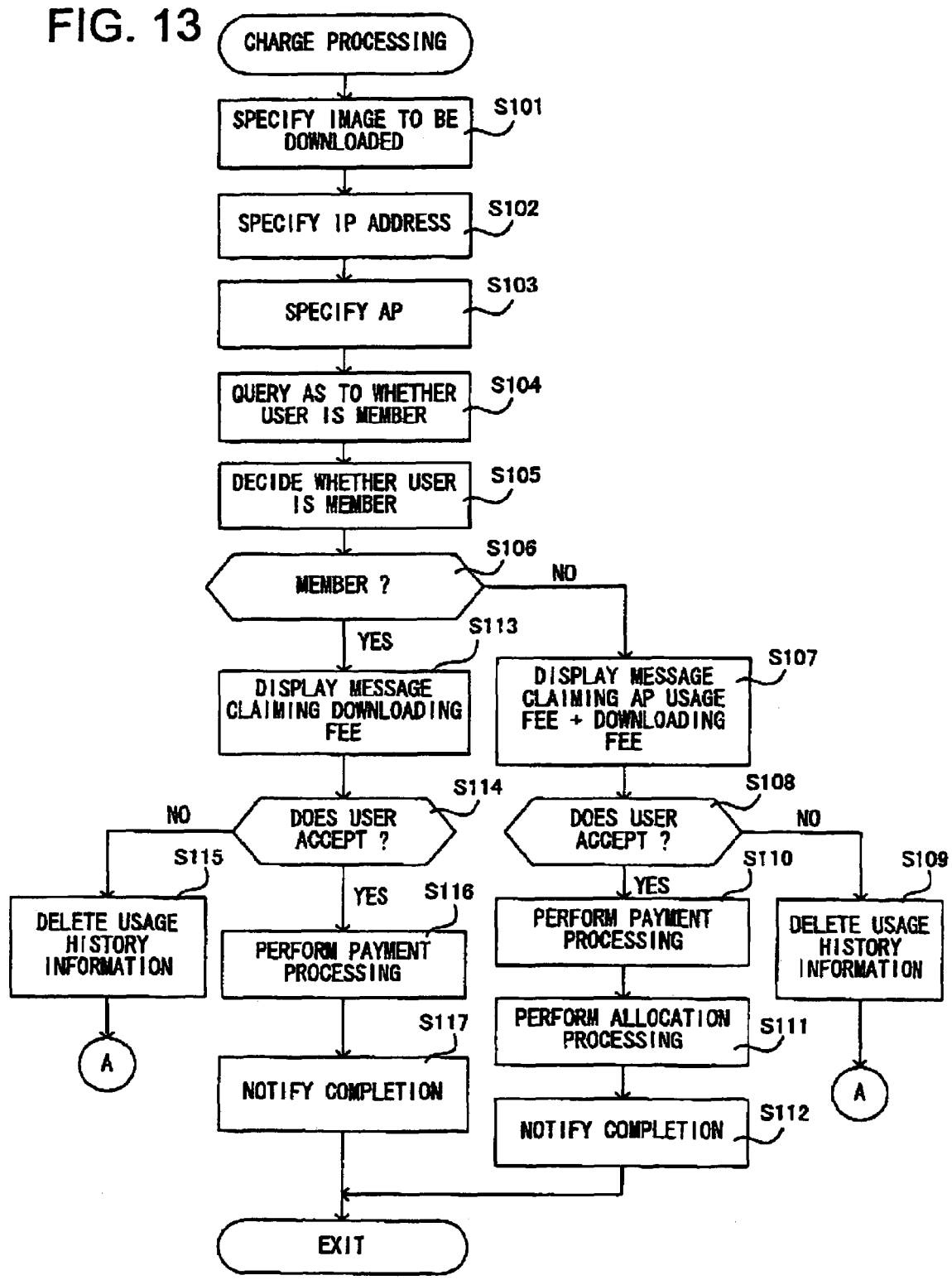
FIG. 13 is a flow chart showing a subroutine for charge processing.

FIG. 13 is a flow chart showing a subroutine for this charge processing. Although, for the sake of convenience of explanation, the processes performed by the image storage device 6, the PC 7, the account management device 10, and the second access management device 9 are all described together in the flow chart of FIG. 13, actually each of the image storage device 6, the PC 7, the account management device 10, and the second access management device 9 in fact performs its own individual processing steps by executing its own individual program.

As shown in FIG. 13, during this execution of charge processing, first, by the image storage device 6, the image which the user wishes to download is specified based upon the image ID information which is included in the image management data transmitted from the PC 7 (a step S101).

Next, the image registration data which includes the image ID specified in the step S101 is read out from the image registration history DB which is recorded upon the HD 65 of the image storage device 6, and the IP address which was used when storing the encoded data in the image storage device 6 is specified based upon the IP address information which is included in this image registration data (a step S102).

Next, the IP address which was specified in the step S102 and the IP address DB which is recorded upon the HD 65 of the image storage device 6 are compared together, and the AP which was used when storing the encoded data in the image storage device 6 is specified (or identified) (a step S103). Since, in this embodiment, when transmitting the encoded data to the image storage device 6, the user accesses the network 2 via the first AP 4, accordingly the first AP 4 is specified as the AP which was used when storing the encoded data in the image storage device 6.

When the first AP 4 is specified as the AP which was used when storing the encoded data, along with the IP address which was specified in the step S102 being transmitted from the image storage device 6 to the first access management device 5, also a query signal is transmitted which queries as to whether or not the user who has used this IP address is a member of the first AP service business (a step S104).

Next, by the first access management device 5, the IP address which has been transmitted from the image storage device 6 and the access history DB which is recorded upon the HD 55 of the first access management device 5 are compared, and a decision is made as to whether or not the user who is requesting a download of the encoded data is a member of the first AP service business (in steps S105, S106). The result of this decision is transmitted via the network 2 from the first access management device 5 to the image storage device 6.

If the result of this decision is that the user who stored the encoded data in the image storage device 6 was not a member of the first AP service business, then, by the image storage device 6, an AP usage fee for usage of the first AP 4 is added to the downloading fee which is required for downloading the encoded data recorded in the image storage device 6, and the total amount is determined as being the cost of the procedure.

Next, by the image storage device 6, a notification to the effect that payment of the cost of the procedure is being demanded is transmitted to the PC 7 (a step S107), and a note specifying the cost of the procedure and a query message is displayed upon the display unit 78 of the PC 7 as to whether or not the user accepts the cost of the procedure and wishes the download procedure to be performed (a step S108).

If the result is that a message is inputted to the effect that the user does not accept the cost of the procedure and wishes the downloading procedure to be stopped, then the processing information and the data and time information which were appended in the step S40 of FIG. 11 to the second record of the usage history information of the image registration data are deleted (a step S109). In this manner, the contents of the image registration history DB is rewritten to the same contents as the contents of the image registration history DB before the download request was received, in other words to the contents of the image registration history DB shown in FIG. 7; and thereafter the downloading processing is terminated without executing downloading of the encoded data.

By contrast, if the result is that a message is inputted to the effect that the user accepts the cost of the procedure and wishes the downloading procedure to be executed, then a signal is transmitted from the image storage device 6 to the account management device 10 which commands an electronic money transfer for the cost of the procedure from the account of the user to the account of the storage service business. And thereafter, by the account management device 10, payment processing is performed to transfer the cost of the procedure electronically from the account of the user to the account of the storage service business (a step S110).

Next, a signal is transmitted from the image storage device 6 to the account management device 10 which commands an electronic money transfer for the AP usage fee from the account of the storage service business to the account of the first AP service business, and, by the account management device 10, allocation processing is performed to transfer the AP usage fee electronically from the account of the storage service business to the account of the first AP service business (a step S111).

When the payment processing and the allocation processing described above have been completed, data is transferred from the image storage device 6 to the PC 7 to the effect that the payment procedure has been completed, and a message is displayed upon the display unit 78 of the PC 7 to the effect that the payment procedure has been completed (a step S112).

On the other hand, if the result of the decision in the step S106 is that the user who recorded the encoded data in the image storage device 6 was a member of the first AP service business, then, along with determining that the cost of the procedure is only the downloading fee, a query message as to whether or not to perform the downloading procedure is displayed upon the display unit 78 of the PC 7 (steps S113 and S114).

If a reply is inputted to the effect that the user does not accept the cost of the procedure and wishes the downloading procedure to be stopped, then, in the same manner as in the step S109, the data items which were appended to the second record of the usage history information of the image registration data are deleted, and the downloading procedure is terminated (a step S115). By contrast, if a message is inputted to the effect that the user accepts the cost of the procedure and wishes the downloading procedure to be executed, then the payment processing is performed in the same manner as in the step S110, and payment processing is performed to transfer the cost of the procedure electronically from the account of the user to the account of the storage service business (a step S116).

When this charge processing has been completed, as shown in FIG. 11, by the image storage device 6, the encoded data for which downloading is being requested by the user is read out from the HD 65 of the image storage device 6, and is transmitted to the PC 7 via the network 2 and the second AP 8 (a step S42).

Next, by the PC 7, the encoded data is decoded using the encoding key which was transmitted when the digital camera was cable connected to the PC 7, and the image data is reproduced (a step S43). Finally, an image is displayed upon the display unit 78 of the PC 7 based upon the image data which has been reproduced, and, in this manner, a state is established in which it is possible for the user to view the image which was photographed by the digital camera 3.

As described above, in this embodiment, the structure is such that, along with it being specified which AP was used for transmission of the encoded data to the image storage device 6 by the user who stored the encoded data, it is also specified whether or not he is a member of the AP service business which manages the AP which was used, and furthermore, during charge processing, if the user is not a member of that AP service business, then an AP usage fee is paid to the AP service business. Due to this, the AP service business is enabled to retrieve this usage fee even if used by a user who is not a member of the AP service business, and moreover the storage service business is enabled to provide image storage service to a user without any limitation of the area in which he can connect to the network 2. Accordingly, the user is enabled to store his encoded data in the image storage device 6 freely from any connection area that he desires, without any requirement to choose in advance an area in which it is possible for him to operate. Furthermore, if the user enters into an image storage service contract with the storage service business, then he becomes able to store his encoded data freely in the image storage device 6, even without entering into internet contracts with a large number of AP service businesses, and accordingly it is possible to alleviate the economic burden upon the user. In other words, it becomes possible to provide an image storage service whose convenience is excellent.

Moreover, in this embodiment, the structure is such that, when the image data has been generated by the digital camera 3, along with generating the low resolution data and the high resolution data, after having transmitted the encoded data to the image storage device 6, this encoded data is deleted from the internal memory 38 of the digital camera 3, and only the low resolution data continues to be recorded therein. In particular, since the low resolution data is data which is generated by thinning down or sub-sampling the original image data, accordingly, as compared with the original image data and the encoded data, the size of this data is extremely small, so that it becomes possible greatly to economize upon the storage capacity of the internal memory 38 of the digital camera 3.

Furthermore since, in this embodiment, it is arranged not to transmit the original image data to the image storage device 6, but rather only to transmit the encoded data thereto, accordingly the original image data is not recorded in the image storage device 6, so that it is possible to prevent the images which have been photographed by the digital camera 3 from being viewed by a third party who is not authorized to do so.

The present invention is not to be considered as being limited to the embodiment described above, since it would possible to make various alterations thereto, within the scope of the appended Claims; it goes without saying that such alterations are also to be considered as being included within the scope of the present invention.

For example although, in the image storage system 1 of the embodiment described above, the structure is such that the image storage device 6 specifies whether or not the AP which is used when transmitting the image data created by the digital camera 3 to the image storage device 6 is an AP which is managed by an AP service business to which the user is registered as a member, and charge processing is performed based thereupon, it would also be acceptable to provide a structure in which it is specified whether or not the AP which is used when downloading the encoded data stored in the image storage device 6 is an AP which is managed by the AP service business with which the user has performed registration as a member, and charge processing is performed based thereupon.

Furthermore although, with the image storage system 1 of the embodiment described above, it is arranged to perform charge processing when a request for downloading the encoded data which has been stored in the image storage device 6 has been made, a structure would also be acceptable in which it is arranged to perform charge processing when a request is made for storage of the image data in the image storage device 6, instead of or in addition to when a request for downloading has been made.

Yet further although, with the image storage system 1 of the embodiment described above, it is arranged for the image data to be created by the digital camera 3, in fact the image creation means which creates image data need not necessarily be a digital camera; it would also be acceptable for it to be some device other than a digital camera, such as a scanner, a PC upon which an image editing program has been installed, or the like.

Still further although, with the image storage system 1 of the embodiment described above, it is arranged for the digital camera 3 to create the low resolution data and to record it in its own internal memory 38, it would also be acceptable, instead of creating such low resolution data, to create thumbnail image data for thumbnail display to reduce the size of the image, and to record this thumbnail image data in the internal memory 38.

Even further although, with the image storage system 1 of the embodiment described above, it is arranged for the digital camera 3 to encode the image data and to transmit the encoded data to the image storage device 6, it is not actually necessary to create encoded data; it would also be acceptable to provide a structure in which the image data which has been obtained by photography is transmitted to the image storage device 6 just as it is, without being encoded.

Moreover although, with the image storage system 1 of the embodiment described above, it was arranged for the digital camera 3 to record the low resolution data and the encoded data in the internal memory 38, it would also be acceptable to provide a structure in which, instead of being recorded in the internal memory 38, the low resolution data and the encoded data are recorded upon an externally attached removable recording medium, such as a memory card or the like.

Yet further although, with the image storage system 1 of the embodiment described above, it was arranged for the encoded data stored in the image storage device 6 to be downloaded to the PC 7, the device to which the encoded data is downloaded may be some device other than a PC if it is possible to display the image, and it would also be acceptable to provide a structure in which the encoded data stored in the image storage device 6 is downloaded to the same digital camera 3 itself which previously transmitted this encoded data to the image storage device 6.

Even further although, in the embodiment described above, the explanation presumed an image storage system in which the digital camera 3 and the PC 7 were connected to the network 2 via a wireless LAN, the present invention is not to be considered as being limited to such an image storage system in which the image data is transmitted and received employing a wireless LAN; for example, it would also be acceptable to apply the present invention to an image storage system in which, in general, the digital camera 3 and the PC 7 are connected to the network 2, and access the network 2 and transmit and receive data, via APs, such as for example an image storage system in which the digital camera 3 and the PC 7 are connected to the network 2 via a cable LAN.

What is claimed is:

1. A method for conducting data communication between an electric device and a specific server provided by a specific IT service provider through an access point provided by a wireless LAN service provider, the method comprising:

requesting by the electric device the data communication with the specific server by the access point of the wireless LAN service provider, judging by the access point whether or not the data communication is requested by a person who is not a subscriber to the wireless LAN service provider and whether or not the data communication is directed to the specific server, specially permitting the data communication by the access point when the access point judges that the data communication is requested by the person who is not a subscriber to the wireless LAN service provider and that the data communication is directed to the specific server, and permitting the data communication by the access point to both the specific server and a server other than the specific server when the access point judges that the data communication is requested by a person who is a subscriber to the wireless LAN service provider.

2. The method for conducting data communication according to claim 1, further comprising:

storing data received through the specially permitted data communication in the specific server;

judging whether or not data requested to be downloaded has been received through the specially permitted data communication, charging to a person who requests a data download in accordance with the judgment in the judging step, and transmitting the requested data to the person requesting data download.

3. The method for conducting data communication according to claim 2, wherein:

the charging step comprises determining an amount of charge for data download such that if the person who requests the data download is the subscriber to the wireless LAN service provider, the amount of charge is only for a download fee for the data.

4. The method for conducting data communication according to claim 2, wherein:

the charging step comprises determining an amount of charge for data download such that if the person who requests the data download is not the subscriber to the wireless LAN service provider, the amount of charge is determined to include both a usage fee of the access point and a download fee for the data.

5. The method for conducting data communication according to claim 2, wherein:

when the specific server stores the received data therein, an identifier identifying the specially permitted data is attached to the stored data when the received data is received via the specially permitted data communication, and the specific server judges whether or not the data requested to be downloaded has been received via the specially permitted data communication by the identifier upon receiving the request of data download.

6. A system for storing data received in data communication conducted through an access point provided by a wireless LAN service provider comprising:
- a server provided by a specific IT service provider that receives and stores data received via data communication specially permitted by the wireless LAN service provider;
- an electric device that requests data communication with the specific server; and
- a control unit for controlling the access point to specially permit the data communication when the data communication is requested by the person who is not the subscriber to the wireless LAN service provider and the data communication is directed to the specific server, and to forbid the data communication directed to a server other than the specific server, wherein
- the specific server includes a data storage that stores therein the data received in the data communication with the control unit for the access point.

7. The system for storing data according to claim 6, wherein the specific server comprises:
- a judging unit that judges whether or not data requested to be downloaded has been received through the specially permitted data communication; and
- a charging unit that charges to a person who requests a data download in accordance with the judgment by the judging unit.

8. The system for storing data according to claim 7, wherein:
- the charging unit comprises a determining unit that determines an amount of charge for data download such that if the person who requests the data download is a subscriber to the wireless LAN service provider, the amount of charge includes only a fee for the download of the data.

9. The system for storing data according to claim 7, wherein:
- the charging unit comprises a determining unit that determines an amount of charge for data download such that if the person who requests the data download is not the subscriber to the wireless LAN service provider, the amount of charge includes both a usage fee of the access point and a download fee for the data.

10. The system for storing data according to claim 7, wherein:
- the data storage stores the received data therein to which an identifier identifying the specially permitted data is attached when the received data has been received via the specially permitted data communication, and
- the judging unit judges whether or not the data requested to be downloaded has been received via the specially permitted data communication by the identifier upon receiving the request of data download.

11. A data storage used in the system according to claim 6, comprising:
- a judging unit that judges whether or not data requested to be downloaded has been received through the specially permitted data communication; and
- a charging unit that charges to a person who requests a data download in accordance with the judgment by the judging unit.

12. The data storage according to claim 11, wherein:
- the charging unit comprises a determining unit that determines an amount of charge for data download such that if the person who requests the data download is a subscriber to the wireless LAN service provider, the amount of charge includes only a download fee for the data.

13. The data storage according to claim 11, wherein:
- the charging unit comprises a determining unit that determines an amount of charge for data download such that if the person who requests the data download is not the subscriber to the wireless LAN service provider, the amount of charge includes both a usage fee of the access point and a download fee for the data.

14. The data storage according to claim 11, wherein:
- the data storage stores the received data therein to which an identifier identifying the specially permitted data is attached when the received data has been received via the specially permitted data communication, and
- the judging unit judges whether or not the data requested to be downloaded has been received via the specially permitted data communication by the identifier upon receiving the request of data download.

* * * * *